3,437,627
POLYAMIDE-DIBENZENYLBENZENE
COMPOSITIONS
Armin Gude, Marl, and Willi Haake, Recklinghausen, Germany, assignors to Chemische Werke Huls Aktiengesellschaft, Marl, Germany, a corporation of Germany
No Drawing. Filed June 14, 1966, Ser. No. 557,381
Claims priority, application Germany, Aug. 19, 1965, C 36,683
Int. Cl. C08g 51/28, 51/36, 41/06
U.S. Cl. 260—31.2                                    6 Claims

ABSTRACT OF THE DISCLOSURE

A polyamide, whether a homopolymer or a mixed polyamide, is advantageously plasticized by means of a dibenzylbenzene compound such for example as dibenzyltoluene.

---

It is known that heretofore essentially only compounds which contain hydroxyl, ester or amido groups could be used as plasticizers for polyamides (see Hopff-Müller-Wenger, Die Polyamide (1954) page 188 and following).

It has now been found that the dibenzylbenzenes of the general formula

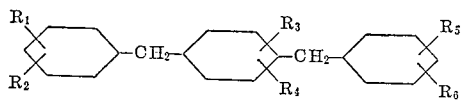

in which $R_1$ to $R_6$ each stands for a member selected from the group consisting of hydrogen, halogen, and the alkyl, cycloalkyl, aralkyl, and aryl groups are useful as plasticizers for polyamides.

The name polyamides as used herein is understood to embrace the homo-polycondensates of aliphatic, cycloaliphatic and aromatic dicarboxylic acids with diamines, e.g. the polycondensation products of adipic, sebacic and terephthalic acids with hexamethylenediamine, phenylenediamine and cyclohexamethylenediamine, also the polycondensation products of aminocarboxylic acids e.g. ω-aminoundecylic acid and polymerization products of lactams such as caprolactam and laurinlactam as well as mixed polymers and mixed polycondensates produced from diamines and dicarboxylic acids or aminocarboxylic acids or lactams.

The dibenzylbenzenes may be substituted by alkyl groups having from 1 to 4 carbon atoms or by halogen atoms or by cycloalkyl groups or by aryl or aralkyl groups. The total number of aliphatic carbon atoms in groups $R_1$ to $R_6$ preferably should not exceed 25. The aryl and aralkyl groups improve the compatability with the polyamides.

In addition to dibenzylbenzene itself dibenzyltoluene, tribenzyltoluene, dixylyltoluene and 4,4'-dichlorodibenzyltoluene as well as their alkyl, cycloalkyl, aryl, aralkyl and halogen derivatives and mixtures thereof which are technically readily available e.g. by the process described in German Patent No. 1,085,877 are suitable for use in the present invention.

The dibenzylbenzenes are added to the homo and mixed polyamides in the usual known way. Thus, the polyamide granulate or powder is mixed in a suitable mixing device with the desired amount of the dibenzylbenzene at a temperature below the softening point of the polyamide and then worked up in a suitable device at a temperature above the softening point of the polyamide into finished or semifinished articles. Or, after the mixing described above the mixture can be run through a suitable extruder at a temperature above the softening temperature of the polyamide and the extruded product cooled and granulated.

Due to the fact that the dibenzylbenzenes are compatible with practically all organic solvents they may be added to polyamide solutions. The resulting solutions are then worked up in suitable machines and the solvent removed from the resulting articles in the usual manner.

The dibenzylbenzenes generally are mixed with homopolyamides in amounts within the range from 0.3 to 30% by weight and preferably within the range from 3 to 15% by weight. In the case of mixed polyamides the dibenzylbenzenes generally are added in amounts within the range from 0.3 to 45% by weight and preferably within the range from 3 to 25% by weight.

Advantageously the dibenzylbenzenes can be added to the monomers before the hydrolytic, anionic and cationic polymerization. This procedure was not possible within the plasticizers heretofore investigated because they would enter into the polymerization reaction as chain breakers. The dibenzylbenzenes are extracted, especially by water, in smaller amounts than the previously investigated plasticizers. The cold stability of the polyamides is not damaged by the dibenzylbenzene addition. It is to be noted further that, as compared with ester and amide plasticizers the dibenzylbenzenes have a greater resistance to alkalies and acids.

The dibenzylbenzenes can also, is desired, be used in admixtures with the usual plasticizers such as p-hydroxybenzoic acid esters and benzene sulfonic acid-N-alkylamides. In this case, obviously, the dibenzylbenzene is added to the polyamide and not to the monomeric lactams.

The miscibility and compatibility of the dibenzylbenzenes with the known plasticizers is nearly unlimited. In general mixtures are used in which the weight ratio of the usual plasticizer to be dibenzylbenzene is within the range from 10:90 to 80:20 and preferably from 30:70 to 60:40.

Plasticized polyamides which contain mixtures of dibenzylbenzenes and a known polyamide plasticizer exhibit, for example, an improved resistance to heat-ageing as compared with plasticized polyamides that contain only dibenzylbenzene. The dibenzylbenzenes therefore are used in admixture with the known plasticizers if especially high requirements with respect to resistance to heat-ageing exist.

It is to be noted however that the dibenzylbenzenes advantageously can be ussed alone as plasticizers for polyamides especially if a good cold shock resistance of the plasticized polyamide or a high resistance to the extraction of the plasticizer by water is desired.

EXAMPLE 1

80 parts by weight of polylaurinlactam was homogeneously mixed in an extruder at 220° C. with 20 parts by weight of dibenzyltoluene and the resulting mixture was granulated. The properties of test pieces produced from the resulting plasticized polyamide are given in the table which follows the specific examples.

EXAMPLE 2

90 parts by weight of polylaurinlactam were homogeneously mixed in an extruder at 220 C. with 10 parts by weight of dixylylxylene and then granulated. The properties of test pieces made therefrom are shown in the table.

EXAMPLE 3

90 parts by weight of polylaurinlactam was homogeneously mixed in an extruder at 220° C. with 10 parts by weight of 4,4'-dichlorodibenzyltoluene and the mixture granulated. The amount of plasticizer extracted by cold and hot water is shown in the table.

EXAMPLE 4

90 parts by weight of monomeric laurinlactam and 10 parts by weight of dibenzyltoluene were mixed and catalytically polymerized under known conditions. Plasticized polylaurinlactam was produced. The polymerization was not hindered by the presence of the dibenzyltoluene. The properties of test pieces made from the resulting product are given in the following table.

| | Extraction loss with water on plates 1 mm. thick, percent | | Ball pressure hardness, VDE 0303 § 6.10 kp./cm.² | Bending stress limit, DIN 53-452, kp./cm.² | Tensile strength at the yield point per DIN 53-371, test piece 1 per DIN 53-504, kp./cm.² | Cold shock resistance, ° C. |
|---|---|---|---|---|---|---|
| | At 20° C. for 170 h. | At 100° C. for 9 h. | | | | |
| Example 1 | 0.06 | 0.35 | 600 | 330 | 265 | −60 |
| Example 2 | 0.05 | 0.3 | | | | |
| Example 3 | 0.03 | 0.7 | | | | |
| Example 4 | 0.07 | 0.7 | 680 | 380 | 300 | −40 |
| 20% p-hydroxybenzoic acid ester | 0.09 | 0.7 | 390 | 205 | 200 | −40 |
| 20% benzenesulfonic acid-N-methylamide | 5.4 | 16.5 | 440 | 215 | 225 | −40 |
| Polylaurin-lactam without plasticizer | 0.01 | 0.2 | 1050 | 640 | 400 | −60 |

We claim:

1. A composition consisting essentially of a polyamide and from 0.3 to 45% by weight of at least one dibenzylbenzene of the general formula

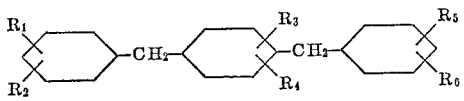

in which each of $R_1$ to $R_6$ stands for a member selected from the group consisting of hydrogen, halogen, alkyl groups containing from 1 to 4 carbon atoms, cycloalkyl, aryl and aralkyl groups, the total number of carbon atoms in $R_1$ to $R_6$ being not substantially more than 25.

2. A composition as defined in claim 1 comprising a mixture of dibenzylbenzenes.

3. A composition as defined in claim 1 in which the polyamide is a homopolymer and the dibenzylbenzene is present in an amount within the range from 3 to 15% by weight.

4. A composition as defined in claim 1 in which the polyamide is a mixed polyamide and the dibenzylbenzene is present in an amount within the range from 3 to 25% by weight.

5. A composition as defined in claim 1 containing a known polyamide plasticizer selected from the group consisting of esters and amides in quantity, relative to the dibenzylbenzene within the range from 10:90 to 80:20.

6. Process for the production of a plasticized polyamide composition which comprises adding at least one dibenzylbenzene of the general formula

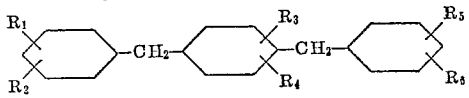

in which each of $R_1$ and $R_6$ stands for a member selected from the group consisting of hydrogen, halogen, alkyl groups containing from 1 to 4 carbon atoms, cycloalkyl, aryl and aralkyl groups, the total number of carbon atoms in $R_1$ to $R_6$ being not substantially more than 25 to a monomer prior to the hydrolytical or catalytical polymerization thereof to form a polyamide and then polymerizing the mixture.

References Cited

UNITED STATES PATENTS

| 2,728,737 | 12/1955 | Wittcoff | 260—33.6 |
| 3,043,886 | 7/1962 | Serres et al. | |
| 3,252,905 | 5/1966 | Schaeffer | 260—33.6 |

FOREIGN PATENTS

| 1,085,877 | 1/1961 | Germany. |

MORRIS LIEBMAN, *Primary Examiner.*

R. S. BARON, *Assistant Examiner.*

U.S. Cl. X.R.

260—32.6, 33.6, 668